US009432291B2

(12) United States Patent
Hallivuori et al.

(10) Patent No.: US 9,432,291 B2
(45) Date of Patent: Aug. 30, 2016

(54) METHOD AND A DEVICE FOR DEFINING A LOOK-UP SYSTEM FOR A NETWORK ELEMENT OF A SOFTWARE-DEFINED NETWORK

(71) Applicant: TELLABS OY, Espoo (FI)

(72) Inventors: Ville Hallivuori, Espoo (FI); Juhamatti Kuusisaari, Helsinki (FI)

(73) Assignee: CORIANT OY, Espoo (FI)

( * ) Notice: Subject to any disclaimer, the term of this patent is extended or adjusted under 35 U.S.C. 154(b) by 156 days.

(21) Appl. No.: 14/146,132

(22) Filed: Jan. 2, 2014

(65) Prior Publication Data

US 2014/0192811 A1    Jul. 10, 2014

(30) Foreign Application Priority Data

Jan. 4, 2013   (FI) ..................................... 20135014

(51) Int. Cl.
*H04L 12/741* (2013.01)
(52) U.S. Cl.
CPC .................................. *H04L 45/745* (2013.01)
(58) Field of Classification Search
CPC .................................................... H04L 45/745
USPC ........................................ 370/351, 389, 392
See application file for complete search history.

(56) References Cited

U.S. PATENT DOCUMENTS

| 5,408,434 | A | 4/1995 | Stansfield |
| 5,473,267 | A | 12/1995 | Stansfield |
| 6,061,368 | A | 5/2000 | Hitzelberger |
| 6,556,541 | B1 * | 4/2003 | Bare ...................... H04L 12/185 370/235 |
| 6,788,700 | B1 | 9/2004 | Nakil |
| 7,167,471 | B2 * | 1/2007 | Calvignac et al. ........... 370/389 |
| 7,669,234 | B2 * | 2/2010 | Buer .................. G06F 17/30949 370/389 |
| 8,125,991 | B1 | 2/2012 | Schlansker et al. |
| 2003/0016624 | A1 * | 1/2003 | Bare ............................. 370/217 |
| 2004/0125799 | A1 * | 7/2004 | Buer ............................. 370/389 |
| 2006/0214886 | A1 * | 9/2006 | Takeuchi et al. ............... 345/63 |
| 2007/0083531 | A1 * | 4/2007 | Hussain ................ H04L 9/0643 |

(Continued)

FOREIGN PATENT DOCUMENTS

| EP | 0612154 | 7/1998 |
| WO | 2004021192 A1 | 3/2004 |

OTHER PUBLICATIONS

Haria, Swapnil, "Power-Efficient and Scalable Virtual Router Architecture on FPGA", IEEE, 2012, XP032314262.

(Continued)

*Primary Examiner* — Chi H Pham
*Assistant Examiner* — Robert Lopata
(74) *Attorney, Agent, or Firm* — Young & Thompson

(57) ABSTRACT

A method for defining a look-up system having functionality suitable for a network element of a software-defined network "SDN" includes maintaining (401) data specifying a set of look-up tables so that the look-up system is capable of being constructed in alternative ways using one or more look-up tables of the set of look-up tables and each of the look-up tables has a look-up table specific resource consumption estimate indicating a load factor of at least one component of the network element when running operations related to the look-up table. The method includes selecting (402), on the basis of the look-up table specific resource consumption estimates, such one of the alternative ways of constructing the look-up system which provides a look-up system that is optimal, or at least suitable, for the network element.

23 Claims, 4 Drawing Sheets

(56) References Cited

U.S. PATENT DOCUMENTS

| | | | |
|---|---|---|---|
| 2011/0190029 A1 | 8/2011 | Paerssinen et al. | |
| 2011/0225429 A1* | 9/2011 | Papamanthou | G06F 21/64 713/189 |
| 2012/0036134 A1* | 2/2012 | Malakhov | G06F 9/5016 707/747 |
| 2012/0136846 A1* | 5/2012 | Song | H04L 45/7453 707/698 |
| 2012/0143877 A1* | 6/2012 | Kumar | H04L 45/745 707/747 |
| 2012/0179800 A1* | 7/2012 | Allan et al. | 709/223 |
| 2012/0307640 A1* | 12/2012 | Wackerly | H04L 45/54 370/241 |
| 2013/0036277 A1* | 2/2013 | Szczepkowski et al. | 711/159 |
| 2013/0086017 A1* | 4/2013 | Chao et al. | 707/698 |
| 2013/0163426 A1* | 6/2013 | Beliveau et al. | 370/235 |
| 2013/0163427 A1* | 6/2013 | Beliveau et al. | 370/235 |
| 2013/0163475 A1* | 6/2013 | Beliveau et al. | 370/257 |
| 2014/0003422 A1* | 1/2014 | Mogul et al. | 370/389 |
| 2014/0126374 A1* | 5/2014 | Wang et al. | 370/235 |
| 2014/0169189 A1* | 6/2014 | Kalkunte | 370/252 |

OTHER PUBLICATIONS

European Search Report, dated May 7, 2014, from corresponding EP application.

Finnish Search Report dated Oct. 17, 2013, corresponding to the Foreign Priority Application No. 20135014.

* cited by examiner

METHOD AND A DEVICE FOR DEFINING A LOOK-UP SYSTEM FOR A NETWORK ELEMENT OF A SOFTWARE-DEFINED NETWORK

FIELD OF THE INVENTION

The invention relates generally to a software-defined network "SDN". More particularly, the invention relates to a method, a device, and a computer program for defining a look-up system having functionality suitable for a network element of a software-defined network. Furthermore, the invention relates to a controller system of a software-defined network and to a network element of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

Using the analogy of the postal service, the software-defined networking works, for any given street location, so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements so that the network elements are constantly capable of carrying out the above-illustrated tasks and so that the resources of the network elements are utilized in a sufficiently optimal way. Configuring a network element comprises defining a look-up system with the aid of which the network element is capable of operating as a part of a software-defined network. The look-up system should be such that it provides a desired functionality and, on the other hand, the network element is capable of running operations related to the look-up system. Therefore, there is still a need for technical solutions for defining look-up systems that are suitable for network elements of software defined networks.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for defining a look-up system having functionality suitable for a network element of a software-defined network. A method according to the invention comprises:

maintaining data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table, and selecting, on the basis of the look-up table specific resource consumption estimates, such one of alternative look-up systems which is more suitable for the network element than another one of the alternative look-up systems, each of the alternative look-up systems corresponding to one of the mutually alternative ways to construct the look-up system.

The above-described method for defining a look-up system suitable for the network element can be used for avoiding situations where a network element is not sufficiently resourced to run a look-up system configured to it. Furthermore, it is possible to compute resource consumption estimates for look-up systems of different network elements of the software-defined network so that the resource consumption estimate of each look-up system is determined on the basis of look-up table specific resource consumption estimates of look-up tables comprised by the look-up system under consideration. The resource consumption estimates related to different network elements can be used for optimizing the software-defined network as a whole, e.g. for optimizing the routing topology of the software-defined network.

The look-up table specific resource consumption estimates can be read, for example, from data frames received from the network element to be configured or they can be received from another device or system which is arranged to store sufficient information about the said network element. Furthermore, in methods according to some exemplifying embodiments of the invention, the look-up table specific resource consumption estimates can be read from a local memory which is arranged to store sufficient information about network elements to be configured.

In accordance with the invention, there is provided also a new device for defining a look-up system having functionality suitable for a network element of a software-defined network. A device according to the invention comprises a processing system adapted to:

maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table, and select, on the basis of the look-up table specific resource consumption estimates, such one of alternative look-up systems which is more suitable for the network element than another one of the alternative look-up systems, each of the alternative look-up systems corresponding to one of the mutually alternative ways to construct the look-up system.

In accordance with the invention, there is provided also a new controller system for configuring a network element of a software-defined network. The controller system can be a single apparatus or a combination of a plurality of apparatuses capable of communicating with each other. A controller system according to the invention comprises:

a device according to the invention for defining a look-up system having functionality suitable for the network element, and a data interface for sending, to the network element, configuration data expressing the look-up system having the functionality suitable for the network element.

In accordance with the invention, there is provided also a new software-defined network that comprises one or more network elements and a controller system according to the invention for configuring the one or more network elements. It is to be noted that the controller system or one or more parts of it can also act as one or more network elements that can be e.g. an IP (Internet Protocol) router, a multi-protocol label switching "MPLS" node, a packet optical switch, and/or an Ethernet switch.

In accordance with the invention, there is provided also a new network element for a software-defined network. The network element can be, for example, an Internet Protocol "IP" router, a multiprotocol label switching "MPLS" switch, a packet optical switch, and/or an Ethernet switch. The network element may consist of a single apparatus or a combination of a plurality of apparatuses. Furthermore, the network element may have a modular structure so that it comprises one or more line-interface modules and one or more other modules such as a control module. A network element according to the invention comprises:

a data transfer interface for receiving data and for transmitting data, the received data expressing functionality needed for enabling the network element to operate as a part of the software-defined network, a device according to the invention for defining a look-up system having the functionality expressed by the received data, and a data forwarding section for managing data frames in accordance with the look-up system.

In accordance with the invention, there is provided also a new computer program for defining a look-up system having functionality suitable for a network element of a software-defined network. A computer program according to the invention comprises computer executable instructions for controlling a programmable processing system to:

maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table, and select, on the basis of the look-up table specific resource consumption estimates, such one of alternative look-up systems which is more suitable for the network element than another one of the alternative look-up systems, each of the alternative look-up systems corresponding to one of the mutually alternative ways to construct the look-up system.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied depending claims are mutually freely combinable unless otherwise explicitly stated.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
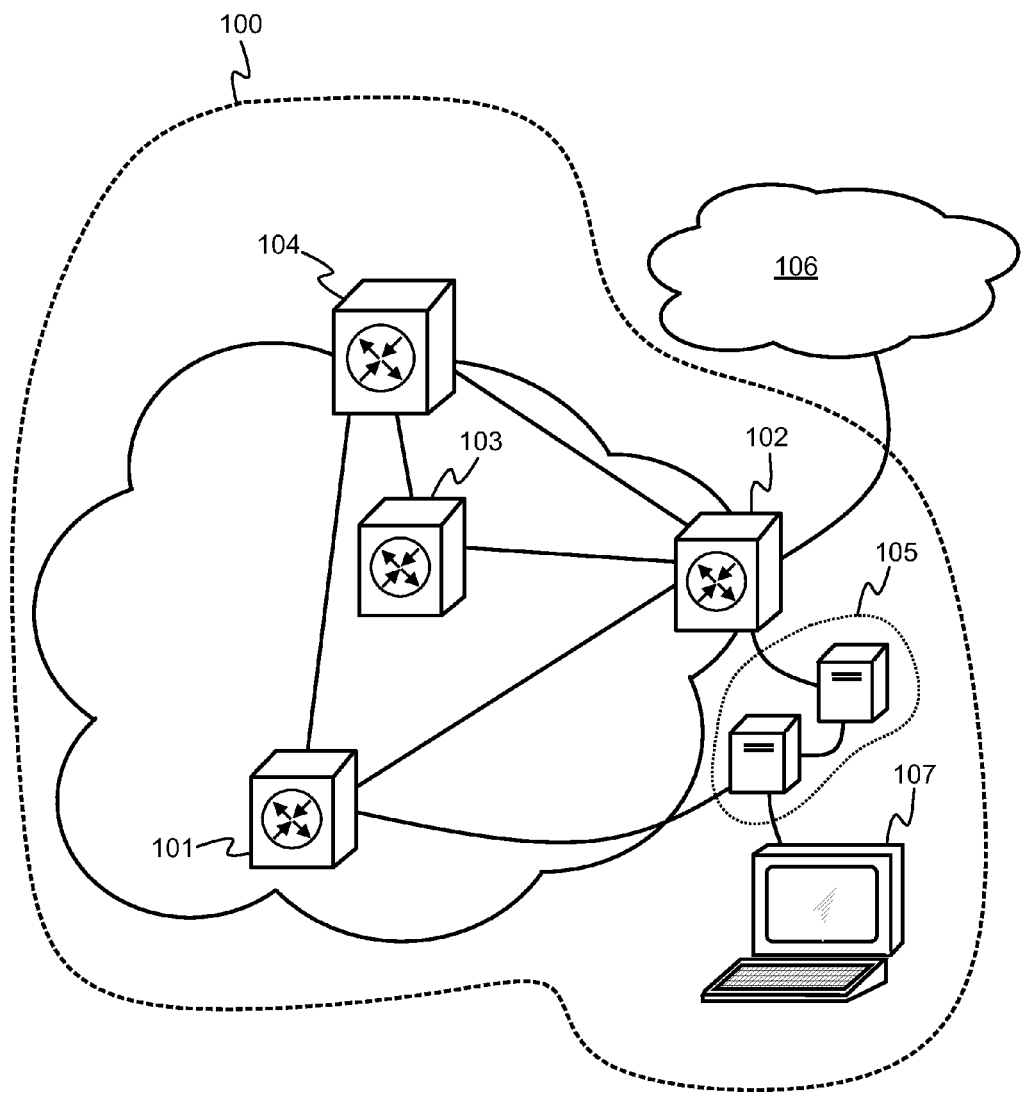
FIG. 1 shows a schematic illustration of a software-defined network according to an exemplifying embodiment of the invention.

FIG. 1 shows a schematic illustration of a software-defined network "SDN" 100 according to an exemplifying embodiment of the invention. The software-defined network comprises network elements 101, 102, 103, and 104 and a controller system 105. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an IP (Internet Protocol) router, a multiprotocol label switching "MPLS" node, a packet optical switch, and/or an Ethernet switch. Each network element may consist of a single apparatus or a combination of a plurality of apparatuses. As well, the controller system 105 may consist of a single apparatus or a combination of a plurality of apparatuses. In the exemplifying case illustrated in FIG. 1, the controller system 105 comprises two interconnected apparatuses. A terminal device 107 is connected to the controller system 105 and the network element 102 acts as a gateway to an external network 106 that can be e.g. the global Internet. The controller system 105 comprises a data transfer interface for receiving data from the terminal device 107 and/or from one or more other devices connected with data transfer links to the data transfer interface of the controller system. It is to be noted that the controller system 105 or one or more parts of it can also act as one or more network elements that can be e.g. an IP (Internet Protocol) router, a multiprotocol label switching "MPLS" node, a packet optical switch, and/or an Ethernet switch.

Each of the network elements 101-104 comprises a control processor section for maintaining a look-up system that comprises at least one look-up table defining actions to be executed in conjunction with managing data frames, and a data forwarding section for managing the data frames in accordance with the look-up system. The at least one look-up table of the look-up system may comprise, for example but not necessarily, one or more successive flow tables and a group table according to the OpenFlow specification. The OpenFlow is managed by the Open Networking Foundation "ONF". In the exemplifying case where the OpenFlow is used, each flow table in a network element contains a set of flow entries. Each flow entry may consist of match fields, counters, and a set of actions to apply to matching data frames. Matching typically starts at the first flow table and may continue to additional flow tables. Flow entries can be arranged into a priority order and the first matching entry in each table is the one being used. If a matching flow entry is found, the one or more actions associated with this specific flow entry are executed. If no match is found in a flow table, the data frame may be forwarded to the controller system 105 over an OpenFlow channel between the network element under consideration and the controller system 105, the data frame may be dropped, or the data frame may continue to the next flow table or to the group table. Actions associated with each flow entry may comprise for example data frame forwarding, data frame modification, group table processing, and pipeline processing. Pipeline processing actions allow data frames to be sent to subsequent flow tables for further processing and allow information, in the form of metadata, to be communicated between the flow tables. Table pipeline processing stops when the one or more actions associated with a matching flow entry does not specify a next table. At this point, the data frame under consideration is usually modified and forwarded. The group table processing actions allow data frames to be sent to the group table for further processing and allow information, in the form of metadata, to be communicated to the group table. The group table contains group entries, where each group entry may contain a list of actions to be directed data frames defined to belong to a particular group.

The controller system 105 is adapted to send, to each of the network elements 101-104, configuration data that comprises data items for configuring the network element under consideration to maintain the look-up system in accordance with, for example, a pre-determined collection of actions defined by a protocol, e.g. the OpenFlow, for configuring network elements. Furthermore, the configuration data may comprise one or more configuration programs each of which comprising one or more computer executable instructions defining an action or a chain of actions to be executed in conjunction with managing data frames in the network element under consideration. The control processor section of each of the network elements 101-104 can be adapted to associate each configuration program to the one or more look-up tables of the look-up system so that the configuration program is callable to be executed in conjunction with managing data frames with the aid of the look-up system. The data forwarding section of each of the network elements 101-104 can be adapted to execute the action or the chain of actions defined by the configuration program in response to a situation in which the managing a particular data frame includes an order to execute the configuration program. The action or the chain of actions defined by the configuration program may comprise for example: reading data from a data frame, modifying the data frame, selecting one or more of egress ports of the network element and forwarding the data frame and its possible duplicates to the selected one or more egress ports, selecting one of the look-up tables of the look-up system and executing a look-up from the selected look-up table, performing arithmetic operations, branching operations, performing logical operations, reading metadata associated with the data frame, writing metadata associated with the data frame, modifying metadata associated with the data frame, dropping the data frame, and/or duplicating the data frame.

In a software-defined network "SDN" according to an exemplifying embodiment of the invention, the controller system 105 is adapted to maintain data specifying a set of look-up tables so that a look-up system suitable for one or more of the network elements 101-104 is capable of being constructed in mutually alternative ways with the aid of one or more look-up tables belonging to the set of look-up tables. Each of the look-up tables has a look-up table specific resource consumption estimate indicating a load factor of at least one component of the network element under consideration when running operations related to the look-up table. The at least one component of the network element may comprise, for example, the data forwarding section of the network element, the control processor section of the network element, one or more random access memories "RAM" of the network element, one or more content access memories "CAM" of the network element, one or more ternary content access memories "TCAM" of the network element, and/or one or more memory busses of the network element.

The above-mentioned look-up table specific resource consumption estimates may comprise, for example, numerical values indicating load factors of one or more components of the network element to be configured. For example, when running operations related to a first exemplifying look-up table, the load factor of the data forwarding section of the network element may be e.g. 50% of the processing capacity, the load factor of random access memories "RAM" of the network element may be e.g. 35% of the memory capacity, the load factor of content access memories "CAM" of the network element may be e.g. 45% of the memory capacity, and the load factor of memory busses may be e.g. 45% of their transfer capacity. Correspondingly, when running operations related to a second exemplifying look-up table, the load factor of the data forwarding section of the network element may be e.g. 46%, the load factor of random access memories "RAM" of the network element may be e.g. 38%, the load factor of content access memories "CAM" of the network element may be e.g. 48%, and the load factor of memory busses may be e.g. 25%. Thus, the look-up table specific resource consumption estimates for the first and second exemplifying look-up tables are the following vectors: [50%, 35%, 45%, 45%] and [46%, 38%, 48%, 25%], respectively.

A resource consumption estimate of a look-up system comprising one or more look-up tables can be obtained by computing a sum of the vectors representing the look-up table specific resource consumption estimates of the one or more look-up tables. For example, the resource consumption estimate of a look-up system consisting of the above-mentioned first and second exemplifying look-up tables would be [96%, 73%, 93%, 70%]. If any of these numerical values exceeded 100%, the network element under consideration would not be capable of running the look-up system under consideration. In this case, a different look-up system should be defined for the network element. It is worth noting that the controller system 105 does not need to know that e.g. the first elements of the vectors representing the look-up table specific resource consumption estimates are related to the data forwarding section of a network element under consideration. Furthermore, the look-up table specific resource consumption estimates may have a different number of numerical values in conjunction with different network elements. For example, the look-up table specific resource consumption estimates related to the network element 102 can be vectors each having two numerical values whereas the look-up table specific resource consumption estimates related to the network element 104 can be scalars each having only one numerical value. Thus, the controller system 105 can be made capable of understanding the look-up table specific resource consumption estimates irrespective of the implementations of the network elements 101-104.

The controller system 105 is adapted to select, on the basis of the look-up table specific resource consumption estimates, such one of alternative look-up systems which is optimal, or at least suitable, for the network element to be configured.

Each of the alternative look-up systems corresponds to one of the mutually alternative ways to construct the look-up system. The controller system 105 is adapted to send, to the network element, configuration data expressing the selected one of the alternative look-up systems. In order to enable the controller system 105 to select the optimal or at least suitable look-up system, the controller system 105 can be, for example, adapted to compute resource consumption estimates for two or more of the alternative look-up systems on the basis of the look-up table specific resource consumption estimates related to the look-up tables contained by the two or more alternative look-up systems and to select a particular one of the two or more alternative look-up systems which has, according to a pre-determined criterion, the most advantageous resource consumption estimate. For another example, the controller system 105 can be adapted to use a genetic algorithm implementing simulated evolution for selecting a suitable one of the alternative look-up systems. For the third example, the controller system 105 can be adapted to use the Dijkstra, A*, or other suitable optimization algorithm for selecting a suitable one of the alternative look-up systems from a search network where the look-up tables are related to nodes of the search network and the look-up table specific resource consumption estimates represents costs related to the nodes or to connections between adjacent nodes. An optimal one of the alternative look-up systems corresponds to a minimum cost route through the search network so that look-up tables related to the minimum cost route form a look-up system having the functionality suitable for the network element. The above-mentioned pre-determined criterion can be, for example, such that a greatest one of numerical values constituting the resource consumption estimate of a look-up system should be as small as possible in order to avoid adverse bottle-necks in the operation of the network element.

The controller system 105 can be adapted to retrieve the above-mentioned look-up table specific resource consumption estimates from the network element to be configured, or from another device or system which is arranged to store sufficient information about the said network element, or from a local memory of the controller system 105. The controller system 105 can be adapted to send one or more first data frames to the network element to be configured and to read the look-up table specific resource consumption estimates from one or more second data frames received from the network element. Advantageously, the one or more first data frames contain descriptors of the look-up tables so as to enable the network element to send, to the controller system 105, appropriate look-up table specific resource consumption estimates. Each of the descriptors of the look-up tables may comprise, for example, the maximum number of entries of the corresponding look-up table, the size of one or more look-up keys of the corresponding look-up table, allowed don't care key matching bit positions in the corresponding look-up table, definitions of tasks related to the entries of the corresponding look-up table, maximum look-up frequency of the corresponding look-up table, and/or the average time between successive updates of the corresponding look-up table.

The resource consumption estimate of a look-up system can be used for avoiding situations where the network element 101, 102, 103 and/or 104 is not sufficiently resourced, i.e. does not have sufficiently effective processors and/or sufficient memory, to run a look-up system configured to it. Furthermore, the resource consumption estimates of the look-up systems of the network elements 101-104 can be used for optimizing the software-defined network 100 as a whole. For example, the controller system 105 can be adapted to configure a routing topology of the software-defined network 100 so that more data traffic load is allocated to a network element under consideration when the resource consumption estimate of the look-up system defined for the network element manifests lower loading of the network element than when the resource consumption estimate of the look-up system manifests higher loading of the network element. The network element may have a modular structure so that it comprises one or more line-interface modules, such as ingress and egress modules, and one or more other modules such as a control module and/or a powering module. In this case, each look-up table specific resource consumption estimate can be provided by a module indicator which expresses the module containing the component whose load factor is indicated by the look-up table specific resource consumption estimate. The module indicator may express the individual module or only a type of the module such as: an ingress module, an egress module, or a module related to control of the network element as whole. The module indicators can be utilized when optimizing the routing topology of the software-defined network 100 for example in a situation where e.g. one or more line-interface modules are at a risk of being overloaded whereas other parts of the network element have still margin in their resource consumptions.

In a software-defined network "SDN" according to an exemplifying embodiment of the invention, one or more of the network elements 101-104 are adapted to receive, from the controller system 105, configuration data that expresses the desired functionality of the look-up system of the network element under consideration and the network element is adapted to define the look-up system suitable for the network element under consideration. In this exemplifying case, the network element is adapted to maintain data specifying a set of look-up tables so that the look-up system suitable for the network element under consideration is capable of being constructed in mutually alternative ways with the aid of one or more look-up tables belonging to the set of look-up tables. The network element is adapted to select, on the basis of the look-up table specific resource consumption estimates, such one of the alternative look-up systems which is suitable for the network element and to implement the said one of the alternative look-up systems so as to enable the data forwarding section of the network element to manage data frames in accordance with the look-up system.

Figure 2:
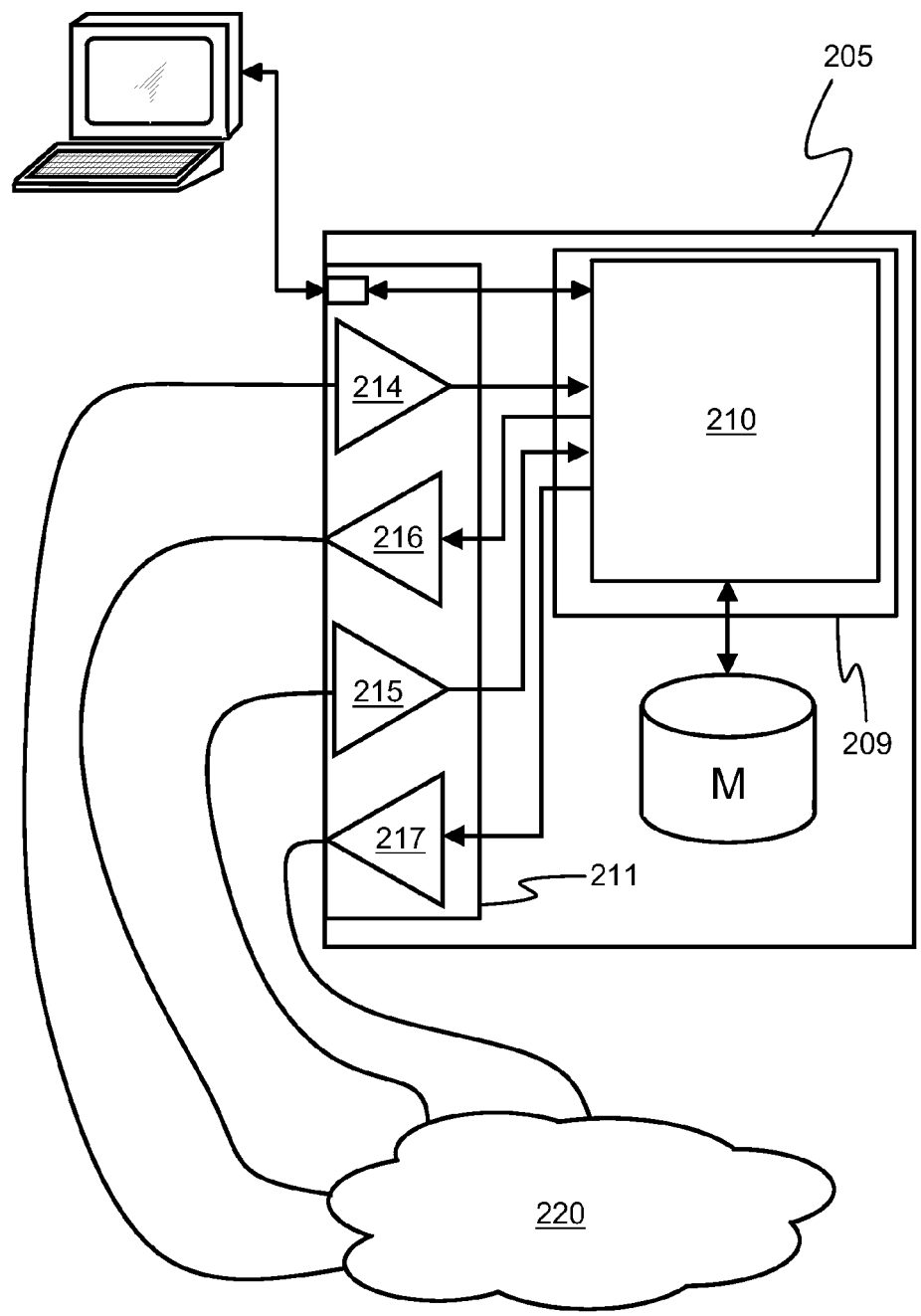
FIG. 2 shows a schematic illustration of a controller system according to an exemplifying embodiment of the invention for configuring a network element of a software-defined network.

FIG. 2 shows a schematic illustration of a controller system 205 according to an exemplifying embodiment of the invention for configuring a network element of a software-defined network. In this exemplifying case, the controller system is a single apparatus but, as mentioned earlier in this document, the controller system could as well be a combination of a plurality of apparatuses. The controller system comprises a data transfer interface 211 for receiving data and for transmitting data. The data transfer interface 211 comprises ingress ports 214 and 215 and egress ports 216 and 217 for connecting via data transfer links to a data transfer network 220. The controller system comprises a device 209 for defining a look-up system having functionality suitable for a network element to be configured. The device 209 comprises means for maintaining data specifying a set of look-up tables so that the look-up system is capable of being constructed in mutually alternative ways with the aid of one or more look-up tables belonging to the set of look-up tables. Each of the look-up tables has a look-up table specific resource consumption estimate indicating a load factor of at least one component of the network element when running operations related to the look-up table. The device 209 further comprises means for selecting, on the basis of the look-up table specific resource consumption estimates, such one of the alternative ways to construct a look-up system which provides a look-up system that is optimal, or at least suitable, for the network element. The above-mentioned means can be implemented with a processing system 210.

In a controller system according to an exemplifying embodiment of the invention, the processing system 210 of the device 209 is adapted to compute resource consumption estimates for two or more of alternative look-up systems on the basis of the look-up table specific resource consumption estimates related to the look-up tables contained by the two or more alternative look-up systems and to select a particular one of the two or more alternative look-up systems which has, according to the pre-determined criterion, the most advantageous resource consumption estimate.

In a controller system according to an exemplifying embodiment of the invention, the processing system 210 of the device 209 is adapted to use a genetic algorithm implementing simulated evolution for selecting a suitable one of alternative look-up systems.

In a controller system according to an exemplifying embodiment of the invention, the processing system 210 of the device 209 is adapted to use the Dijkstra or A* optimization algorithm for selecting a suitable one of alternative look-up systems from a search network where the look-up tables are related to nodes of the search network and the look-up table specific resource consumption estimates represents costs related to the nodes or to connections between adjacent nodes. The optimal one of the alternative look-up systems corresponds to a minimum cost route through the search network so that look-up tables related to the minimum cost route form a look-up system having the functionality suitable for the network element.

In a controller system according to an exemplifying embodiment of the invention, the processing system 210 of the device 209 is adapted to configure a routing topology of the software-defined network so that more data traffic load is allocated to the network element if the resource consumption estimate of the look-up system defined for the network element manifests lower loading of the network element than if the resource consumption estimate of the look-up system manifests higher loading of the network element.

In a controller system according to an exemplifying embodiment of the invention, the processing system 210 of the device 209 is adapted to read the look-up table specific resource consumption estimates from one or more data frames received at the controller system.

In a controller system according to an exemplifying embodiment of the invention, the processing system 210 of the device 209 is adapted to control the controller system to send one or more first data frames to the network element to be configured and to read the look-up table specific resource consumption estimates from one or more second data frames received from the network element. Advantageously, the one or more first data frames contain descriptors of the look-up tables so as to enable the network element to send appropriate look-up table specific resource consumption estimates. Each of the descriptors of the look-up tables may comprise, for example, the maximum number of entries of the corresponding look-up table, the size of one or more look-up keys of the corresponding look-up table, allowed don't care key matching bit positions in the corresponding look-up table, definitions of tasks related to the entries of the corresponding look-up table, maximum look-up frequency of the corresponding look-up table, and/or the average time between successive updates of the corresponding look-up table.

In a controller system according to an exemplifying embodiment of the invention, the look-up table specific resource consumption estimates comprise numerical values indicating load factors of one or more components of the network element and the processing system 210 of the device 209 is adapted to compute, for each of the components of the network element and for each of the alternative look-up systems under consideration, a sum of the numerical values related to that component of the network element and to the look-up tables of the corresponding alternative look-up system. In this case, the sums related to the components of the network element constitute a resource consumption estimate related to the corresponding alternative look-up system.

The processing system 210 of the device 209 shown in FIG. 2 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
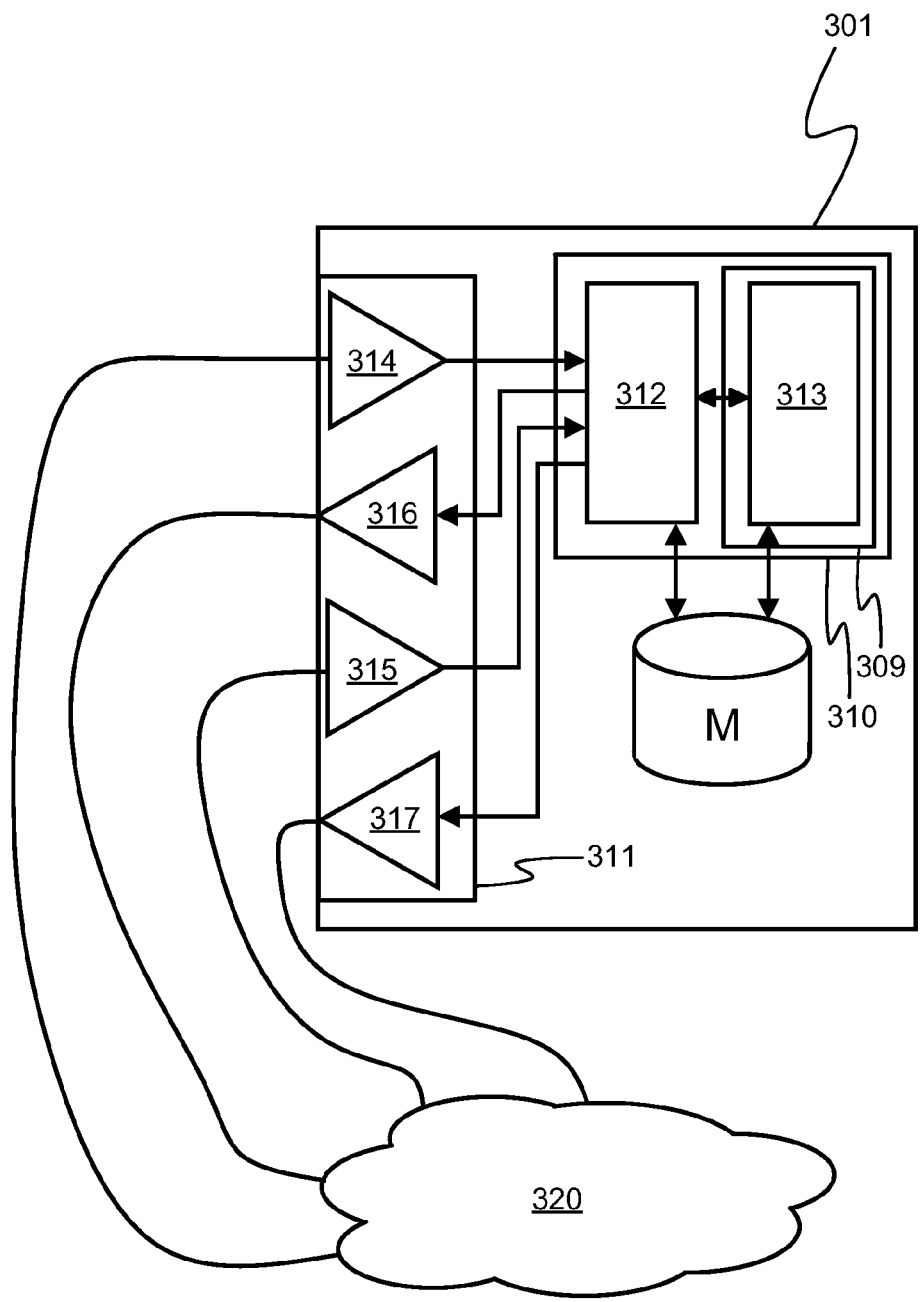
FIG. 3 shows a schematic illustration of a network element according to an exemplifying embodiment of the invention.

FIG. 3 shows a schematic illustration of a network element 301 according to an exemplifying embodiment of the invention. The network element can be, for example, an Internet Protocol "IP" router, a Multiprotocol label switching "MPLS" switch, a packet optical switch, and/or an Ethernet switch. In this exemplifying case, the network element is a single apparatus but, as mentioned earlier in this document, the network element could as well be a combination of a plurality of apparatuses. The network element comprises a data transfer interface 311 for receiving data and for transmitting data. The data transfer interface 311 comprises ingress ports 314 and 315 and egress ports 316 and 317 for connecting via data transfer links to a data transfer network 320. The network element 301 comprises a processing system 310 that comprises a control processor section 313 and a data forwarding section 312. The network element comprises a device 209 for defining a look-up system that has functionality expressed by data received at the network element and that is needed for enabling the network element to operate as a part of a software-defined network. The device 309 comprises means for maintaining data specifying a set of look-up tables so that the look-up system is capable of being constructed in mutually alternative ways with the aid of one or more look-up tables belonging to the set of look-up tables. Each of the look-up tables has a look-up table specific resource consumption estimate indicating a load factor of at least one component of the network element 301 when running operations related to the look-up table. The device 309 further comprises means for selecting, on the basis of the look-up table specific resource consumption estimates, such one of the alternative ways to construct the look-up system which provides a look-up system that is optimal, or at least suitable, for the network element. In the exemplifying case illustrated in FIG. 3, the above-mentioned means are implemented with the control processor section 313. The control processor section 313 is adapted to maintain the look-up system, and the data forwarding section 312 is adapted to manage the data frames in accordance with the look-up system.

The processing system 310 of the network element shown in FIG. 3 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 4:
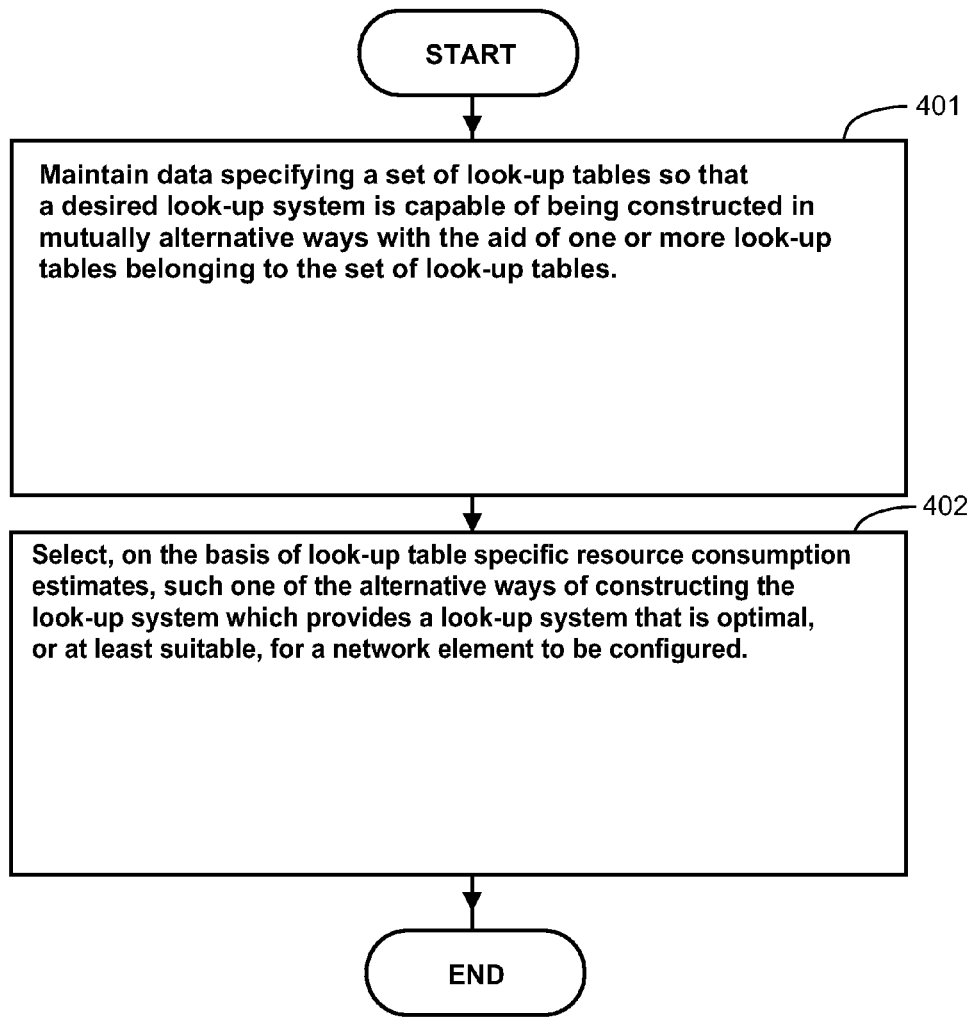
FIG. 4 shows a flow chart of a method according to an exemplifying embodiment of the invention for configuring a network element of a software-defined network.

FIG. 4 shows a flow chart of a method according to an exemplifying embodiment of the invention for defining a look-up system having functionality suitable for a network element of a software-defined network. The method comprises the following actions:
    action 401: maintaining data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table, and
    action 402: selecting, on the basis of the look-up table specific resource consumption estimates, such one of the alternative ways of constructing the look-up system which provides a look-up system that is optimal, or at least suitable, for the network element.

A method according to an exemplifying embodiment of the invention comprises computing resource consumption estimates for two or more of alternative look-up systems on the basis of the look-up table specific resource consumption estimates related to the look-up tables contained by the two or more alternative look-up systems and selecting a particular one of the two or more alternative look-up systems which has, according to the pre-determined criterion, the most advantageous resource consumption estimate.

In a method according to an exemplifying embodiment of the invention, a suitable one of alternative look-up systems is selected with a genetic algorithm implementing simulated evolution.

In a method according to an exemplifying embodiment of the invention, a suitable one of alternative look-up systems is selected with the Dijkstra or A* optimization algorithm from a search network where the look-up tables are related to nodes of the search network and the look-up table specific resource consumption estimates represents costs related to the nodes or to connections between adjacent nodes. An optimal one of the alternative look-up systems corresponds to a minimum cost route through the search network so that look-up tables related to the minimum cost route form a look-up system having the functionality suitable for the network element.

A method according to an exemplifying embodiment of the invention comprises configuring a routing topology of the software-defined network so that more data traffic load is allocated to the network element if the resource consumption estimate of the look-up system defined for the network element manifests lower loading of the network element than if the resource consumption estimate of the look-up system manifests higher loading of the network element.

A method according to an exemplifying embodiment of the invention comprises reading the look-up table specific resource consumption estimates from one or more data frames received at a controller system of the software-defined network.

A method according to an exemplifying embodiment of the invention comprises sending one or more first data frames to the network element to be configured and reading the look-up table specific resource consumption estimates from one or more second data frames received from the network element. Advantageously, the one or more first data frames contain descriptors of the look-up tables so as to enable the network element to send appropriate look-up table specific resource consumption estimates. Each of the descriptors of the look-up tables may comprise, for example, the maximum number of entries of the corresponding look-up table, the size of one or more look-up keys of the corresponding look-up table, allowed don't care key matching bit positions in the corresponding look-up table, definitions of tasks related to the entries of the corresponding look-up table, maximum look-up frequency of the corresponding look-up table, and/or the average time between successive updates of the corresponding look-up table.

In a method according to an exemplifying embodiment of the invention, the look-up table specific resource consumption estimates comprise numerical values indicating load factors of two or more components of the network element and the method comprises computing, for each of the components of the network element and for each of the alternative look-up systems under consideration, a sum of the numerical values related to that component of the network element and to look-up tables of the corresponding alternative look-up system. In this case, the sums related to the components of the network element constitute a resource consumption estimate related to the corresponding alternative look-up system.

In a method according to an exemplifying embodiment of the invention, each of the look-up table specific resource consumption estimates comprises an estimate of at least one of the following load factors caused by the operations related to the corresponding look-up table: a load factor of a data forwarding section of the network element, a load factor of a control processor section of the network element, a load factor of random access memories of the network element, a load factor of content access memories of the network element, a load factor of ternary content access memories of the network element, a load factor of memory busses of the network element.

A computer program according to an exemplifying embodiment of the invention for defining a look-up system comprises computer executable instructions for controlling a programmable processing system to carry out a method according to any of the above-described exemplifying embodiments of the invention.

A computer program according to an exemplifying embodiment of the invention comprises software modules for defining a look-up system having functionality suitable for a network element of a software-defined network. The software modules comprise computer executable instructions for controlling a programmable processing system to:
maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table, and
select, on the basis of the look-up table specific resource consumption estimates, such one of alternative look-up systems which is more suitable for the network element than another one of the alternative look-up systems, each of the alternative look-up systems corresponding to one of the mutually alternative ways to construct the look-up system.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc ("CD"), encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A device for defining a look-up system having functionality suitable for a network element of a software-defined network, the device comprising:
a processing system comprising circuitries configured to:
maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table,
select, on the basis of the look-up table specific resource consumption estimates, one of alternative look-up systems which is more suitable for the network element than another one of the alternative look-up systems, each of the alternative look-up systems corresponding to one of the mutually alternative ways to construct the look-up system having the functionality suitable for the network element, and
configure the network element to perform one or more actions in accordance with the selected look-up system.

2. The device according to claim 1, wherein the processing system comprises circuitries configured to compute resource consumption estimates for two or more of the alternative look-up systems on the basis of the look-up table specific resource consumption estimates related to the look-up tables contained by the two or more alternative look-up systems and to select a particular one of the two or more alternative look-up systems which has, according to the pre-determined criterion, the most advantageous resource consumption estimate.

3. The device according to claim 1, wherein the processing system comprises circuitries configured to use a Dijkstra or A* optimization algorithm to select the one of the alternative look-up systems from a search network where the look-up tables are related to nodes of the search network and the look-up table specific resource consumption estimates represents costs related to the nodes or to connections between adjacent nodes, an optimal one of the alternative look-up systems corresponding to a minimum cost route through the search network so that look-up tables related to the minimum cost route form a look-up system having the functionality suitable for the network element.

4. The device according to claim 1, wherein the look-up table specific resource consumption estimates comprise numerical values indicating load factors of two or more components of the network element, and
the processing system comprises circuitries configured to compute, for each of the components of the network element and for each of the alternative look-up systems under consideration, a sum of the numerical values related to that component of the network element and to look-up tables of the corresponding alternative look-up system, the sums related to the components of the network element constituting a resource consumption estimate related to the corresponding alternative look-up system.

5. The device according to claim 1, wherein each of the look-up table specific resource consumption estimates comprises an estimate of at least one of the following load factors caused by the operations related to the corresponding look-up table: a load factor of a data forwarding section of the network element, a load factor of a control processor section of the network element, a load factor of random access memories of the network element, a load factor of content access memories of the network element, a load factor of ternary content access memories of the network element, and a load factor of memory buses of the network element.

6. A controller system for configuring a network element of a software-defined network, the controller system comprising:
a device configured to define a look-up system having functionality suitable for the network element; and
data interface for sending, to the network element, configuration data ex-pressing the look-up system having the functionality suitable for the network element,
wherein the device comprises a processing system comprising circuitries configured to:
maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table,
select, on the basis of the look-up table specific resource consumption estimates, one of alternative look-up systems which is more suitable for the network element than another one of the alternative look-up systems, each of the alternative look-up systems corresponding to one of the mutually alternative ways to construct the look-up system having the functionality suitable for the network element, and
configure the network element to perform one or more actions in accordance with the selected look-up system.

7. The controller system according to claim 6, wherein the processing system comprises circuitries configured to configure a routing topology of the software-defined network so that more data traffic load is allocated to the network element when a resource consumption estimate of the look-up system manifests lower loading of the network element than when the resource consumption estimate of the look-up system manifests higher loading of the network element, the resource consumption estimate of the look-up system being determined by the one or more look-up table specific resource consumption estimates related to one or more look-up tables comprised by the look-up system.

8. The controller system according to claim 6, wherein the controller system is configured to read the look-up table specific resource consumption estimates from one or more data frames received at the controller system.

9. The controller system according to claim 6, wherein the controller system is configured to send one or more first data frames to the network element and to read the look-up table specific resource consumption estimates from one or more second data frames received from the network element, the one or more first data frames containing descriptors of the look-up tables.

10. The controller system according to claim 9, wherein each of the descriptors of the look-up tables comprises at least one of the following: the maximum number of entries of the corresponding look-up table, the size of one or more look-up keys of the corresponding look-up table, allowed do not care key matching bit positions in the corresponding look-up table, definitions of tasks related to the entries of the corresponding look-up table, a maximum look-up frequency of the corresponding look-up table, and an average time between successive updates of the corresponding look-up table.

11. A network element for a software-defined network, the network element comprising:
a data transfer interface configured to receive data and to transmit data, the received data expressing functionality needed for to enable the network element to operate as a part of the software-defined network;
a device configured to define a look-up system having the functionality expressed by the received data; and
a data forwarding section configured to manage data frames in accordance with the look-up system,
wherein the device comprises a processing system comprising circuitries configure to:
maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table,
select, on the basis of the look-up table specific resource consumption estimates, one of alternative look-up systems which is more suitable for the network element than another one of the alternative look-up systems, each of the alternative look-up systems corresponding to one of the mutually alternative ways to construct the look-up system having the functionality suitable for the network element, and
configure the network element to perform one or more actions in accordance with the selected look-up system.

12. A method for defining a look-up system having functionality suitable for a network element of a software-defined network, the method comprising:
maintaining data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table;
selecting, on the basis of the look-up table specific resource consumption estimates, one of alternative look-up systems which is more suitable for the network element than another one of the alternative look-up systems, each of the alternative look-up systems corresponding to one of the mutually alternative ways to construct the look-up system having the functionality suitable for the network element; and
configuring the network element to perform one or more actions in accordance with the selected look-up system.

13. The method according to claim 12, wherein the method comprises computing resource consumption estimates for two or more of the alternative look-up systems on the basis of the look-up table specific resource consumption estimates related to the look-up tables contained by the two or more alternative look-up systems and selecting a particular one of the two or more alternative look-up systems which has, according to the pre-determined criterion, the most advantageous resource consumption estimate.

14. The method according to claim 12, wherein the one of the alternative look-up systems is selected with a Dijkstra or A* optimization algorithm from a search network where the look-up tables are related to nodes of the search network and the look-up table specific resource consumption estimates represents costs related to the nodes or to connections between adjacent nodes, an optimal one of the alternative look-up systems corresponding to a minimum cost route through the search network so that look-up tables related to the minimum cost route form a look-up system having the functionality suitable for the network element.

15. The method according to claim 12, wherein the look-up table specific resource consumption estimates comprise numerical values indicating load factors of two or more components of the network element and the method comprises computing, for each of the components of the network element and for each of the alternative look-up systems under consideration, a sum of the numerical values related to that component of the network element and to look-up tables of the corresponding alternative look-up system, the sums related to the components of the network element constituting a resource consumption estimate related to the corresponding alternative look-up system.

16. The method according to claim 12, wherein each of the look-up table specific resource consumption estimates comprises an estimate of at least one of the following load factors caused by the operations related to the corresponding look-up table: a load factor of a data forwarding section of the network element, a load factor of a control processor section of the network element, a load factor of random access memories of the network element, a load factor of content access memories of the network element, a load factor of ternary content access memories of the network element, and a load factor of memory buses of the network element.

17. The method according claim 12, further comprising configuring a routing topology of the software-defined network so that more data traffic load is allocated to the network element when a resource consumption estimate of the selected one of the alternative look-up systems manifests lower loading of the network element than when the resource consumption estimate of the selected one of the alternative look-up systems manifests higher loading of the network element, the resource consumption estimate of the selected one of the alternative look-up systems being determined by one or more look-up table specific resource consumption estimates related to one or more look-up tables comprised by the selected one of the alternative look-up systems.

18. The method according to claim 12, further comprising reading the look-up table specific resource consumption estimates from one or more data frames received at a controller system of the software-defined network.

19. The method according to claim 12, further comprising sending one or more first data frames to the network element and reading the look-up table specific resource consumption estimates from one or more second data frames received from the network element, the one or more first data frames containing descriptors of the look-up tables.

20. The method according to claim 19, wherein each of the descriptors of the look-up tables comprises at least one of the following: the maximum number of entries of the corresponding look-up table, the size of one or more look-up keys of the corresponding look-up table, allowed do not care key matching bit positions in the corresponding look-up table, definitions of tasks related to the entries of the corresponding look-up table, a maximum look-up frequency of the corresponding look-up table, and an average time between successive updates of the corresponding look-up table.

21. A non-transitory computer readable medium encoded with a computer program for defining a look-up system having functionality suitable for a network element of a software-defined network, the computer program comprising computer executable instructions for controlling a programmable processing system to:
maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table,
select, on the basis of the look-up table specific resource consumption estimates, one of alternative look-up systems which is more suitable for the network element than another one of the alternative look-up systems, each of the alternative look-up systems corresponding to one of the mutually alternative ways to construct the look-up system having the functionality suitable for the network element,
configure the network element to perform one or more actions in accordance with the selected look-up system.

22. A software-defined network comprising:
one or more network elements, and
a controller system configured to transmit configuration data to the one or more network elements so as to configure the one or more network elements, the controller system comprising
a device configured to define, for at least one of the network elements, a look-up system having functionality suitable for the network element, and
a data interface configured to send, to the network element, configuration data expressing the look-up system, and
the device comprising a processing system comprising circuitries configured to:
maintain data specifying a set of look-up tables so that the look-up system is capable of being constructed in mutually alternative ways with the aid of one or more look-up tables belonging to the set of look-up tables, each of the look-up tables having a look-up table specific resource consumption estimate indicating a load factor of at least one component of the network element when running operations related to the look-up table,
select, on the basis of the look-up table specific resource consumption estimates, one of alternative look-up systems which is more suitable for the network element than another one of the alternative look-up systems, each of the alternative look-up systems corresponding to one of the mutually alternative ways to construct the look-up system having the functionality suitable for the network element, and configure the network element to perform one or more actions in accordance with the selected look-up system.

23. The software-defined network according to claim 22, wherein the controller system is configured to use the OpenFlow as a communication method for a control plane of the software-defined network to communicate with a data plane of the software-defined network.

* * * * *